United States Patent
Maitland, Jr. et al.

(10) Patent No.: US 7,258,016 B2
(45) Date of Patent: Aug. 21, 2007

(54) PRESSURE SENSOR WITH ELECTRONIC DATASHEET

(75) Inventors: William D. Maitland, Jr., Arlington, MA (US); Ian N. Bentley, New Ipswich, NH (US); Kenneth R. Rastatter, Hilliard, OH (US); William F. Rase, Columbus, OH (US); Stephen R. Vicars, Plain City, OH (US); Graham John Tomblin, Columbus, OH (US)

(73) Assignee: Honeywell International Inc., Morristown, NJ (US)

( * ) Notice: Subject to any disclaimer, the term of this patent is extended or adjusted under 35 U.S.C. 154(b) by 26 days.

(21) Appl. No.: 11/316,165

(22) Filed: Dec. 21, 2005

(65) Prior Publication Data

US 2007/0151347 A1    Jul. 5, 2007

(51) Int. Cl.
*G01L 19/04* (2006.01)
(52) U.S. Cl. ...................................................... 73/708
(58) Field of Classification Search ................. 73/717, 73/723, 754, 708; 702/138
See application file for complete search history.

(56) References Cited

U.S. PATENT DOCUMENTS

| | | | |
|---|---|---|---|
| 5,187,674 A | 2/1993 | Bonne | 364/558 |
| 5,307,990 A | 5/1994 | Adams et al. | 236/11 |
| 5,483,826 A | 1/1996 | Schultz et al. | 73/146.5 |
| 5,500,509 A | 3/1996 | Vogt | 219/501 |
| 5,597,020 A | 1/1997 | Miller et al. | 141/95 |
| 5,710,370 A * | 1/1998 | Shanahan et al. | 73/1.35 |
| 5,899,962 A * | 5/1999 | Louwagie et al. | 702/138 |
| 5,983,714 A | 11/1999 | Izumiura et al. | 73/118.1 |
| 6,715,360 B1 | 4/2004 | Pepperling et al. | 73/756 |
| 6,935,156 B2 | 8/2005 | Broden et al. | 73/1.57 |
| 2005/0150303 A1 | 7/2005 | Maitland, Jr. et al. | 73/754 |

* cited by examiner

*Primary Examiner*—Andre J. Allen
(74) *Attorney, Agent, or Firm*—Kermit D. Lopez; Luis M. Ortiz (57) ABSTRACT

A pressure sensing system and method includes a pressure sensor configured to include a pressure sensing diaphragm and a pressure port. A memory circuit incorporated can be incorporated into the pressure port. A high order polynomial component can also be provided. One or more excitation signals are then applicable to the pressure sensor such that a voltage output thereof is measured and recorded at a plurality of predefined temperatures and pressures in order to generate pressure sensor output data. Such output data is then automatically input to the high order polynomial component in order to generate a set of correction coefficients usable for improving the accuracy of the pressure sensor. The pressure sensing diaphragm is preferably based on an Advanced Thick Film (ATF) configuration.

20 Claims, 5 Drawing Sheets

PRESSURE SENSOR WITH ELECTRONIC DATASHEET

TECHNICAL FIELD

Embodiments are generally related to sensing devices and methods thereof. Embodiments are also related to pressure transducers and sensors thereof. Embodiments are additionally related to ATF (Advanced Thick Film) processes and techniques. Embodiments are additionally related to pressure sensors utilized in hazardous applications, such as a natural gas line.

BACKGROUND OF THE INVENTION

Various sensors are known in the pressure sensing arts. Pressure transducers are well known in the art. One example of a pressure transducer is a device formed with a silicon substrate and an epitaxial layer, which is grown on the substrate. A portion of the substrate can then be removed, leaving a thin, flexible diaphragm portion. Sensing components can be located in the diaphragm portion to form a pressure transducer. In operation, at least one surface of the diaphragm can be exposed to a process pressure. The diaphragm deflects according to the magnitude of the pressure, and this deflection bends the attached sensing components. Bending of the diaphragm creates a change in the resistance value of the sensing components, which can be reflected as a change in the output voltage signal of a resistive bridge formed at least partially by the sensing components.

Some techniques for forming a composite diaphragm for a pressure transducer or similar device involve configuring a substrate layer having a first conductivity type, wherein the substrate layer includes a first surface. Positive implants can then be deposited in the first surface of the substrate layer, and an epitaxial layer grown on the first surface of the substrate layer so that the positive implants form positive diffusions in the epitaxial layer. An oxide pattern can be then formed on the epitaxial layer, and a top layer deposited over the epitaxial layer and oxide pattern. The substrate layer and positive diffusions of the epitaxial layer can then be etched to form the composite diaphragm. Such a composite diaphragm can therefore be provided for use in a pressure sensor or like device. The diaphragm comprises a first layer of silicon nitride and a second layer attached to the silicon nitride layer and comprising a pressure sensor pattern of silicon material.

Pressure transducers of the type which comprise a thin, relatively flexible diaphragm portion of suitable material, such as silicon or ceramic, on which either a selected resistive element or a capacitive plate is printed whereby exposure to a pressure source causes deflection of the diaphragm will cause a change in the resistive value of the resistive element or a change in the spacing of the capacitive plate with a mating capacitive plate and concomitantly a change in capacitance are therefore well known in the art.

One area where pressure sensors find critical usage is in the natural gas production and distribution industry. The ability to monitor natural gas line pressures over a wide temperature and pressure range is important in many residential, consumers, commercial and industrial settings. Safety remains a constant concern in any situation in which natural gas is distributed.

For some industrial applications such as, for example, the distribution of combustible process fluids (e.g., combustible gases), explosion proof or flame proof rated regulators, sensing devices, etc. are required. In the case of a regulator, combustible process fluids that accumulate in the regulator housing must be properly vented to ambient or atmosphere to achieve a flame proof or explosion proof rating. Generally, atmospheric venting is configured to prevent the dangerous accumulation of combustible process fluids within the regulator housing and to prevent a combustion process that initiates within the regulator housing from propagating to the greater process ambient surrounding the regulator. For example, one or more sintered metal flame arrestors (which are semi-porous and provide a sufficiently minimal flame path) may be used to provide the necessary atmospheric venting.

Based on the foregoing, it can be appreciated that there exists a continuing need for improved pressure sensors, which can be adapted for use in monitoring hazardous fluids and gases, such as that present in a natural gas line. Not only is safety a factor, but cost is also a concern. A need exists for a highly accurate and low cost pressure sensor for such situations.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved pressure sensor.

It another aspect of the present invention to provide for a pressure sensor, which can be utilized to monitor hazardous applications, such as that found in a natural gas line.

It is a further aspect of the present invention to provide for a pressure sensor system based on Advanced Thick Film (ATF) technology.

The aforementioned aspects and other objectives and advantages can now be achieved as described herein. A pressure sensing system and method are disclosed. A pressure sensor can be configured, which generally includes a pressure sensing diaphragm and a pressure port. A memory circuit can be incorporated into the pressure port. A high order polynomial component can also be provided. One or more excitation signals are then applicable to the pressure sensor such that a voltage output thereof is measured and recorded at a plurality of predefined temperatures and pressures in order to generate pressure sensor output data. Such output data is then automatically input to the high order polynomial component in order to generate a set of correction coefficients usable for improving the accuracy of the pressure sensor.

The pressure sensing diaphragm is preferably base on an Advanced Thick Film (ATF) configuration. The set of correction coefficients is stored in the memory circuit, which may be provided as an EEPROM memory component. The set of correction coefficients is thus stored in the EEPROM memory component.

Additionally, the excitation signals can be provided in the context of a positive signal or a negative signal. A reader circuit can also be provided for accessing and retrieving data from the memory circuit. Such a reader circuit can be provide as, for example, an EEPROM reader.

A math processor can be provided for implementing the high order polynomial component, while a first analog-to-digital converter can be utilized, which receives data generated by the math processor. Such a first analog-to-digital converter is generally connected to the pressure sensor. A second analog-to-digital converter can also be provided, which receives data generated by the math processor. Finally, a temperature sensor can be provided, which is connected to the second analog-to-digital converter.

In general, a high accuracy low-cost pressure sensor can be constructed by combining a diaphragm made utilizing ATF technology in association with a pressure port with an EEPROM memory IC chip. An excitation signal is applied to the pressure sensor and its voltage output is measured and recorded at various predefined temperatures and pressures. The pressure sensor output data is then entered into a high order polynomial. The polynomial generates a set of correction coefficients that can be used to improve the accuracy of the pressure sensor. These coefficients can be permanently stored in the memory of the EEPROM and can be accessed at any time.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
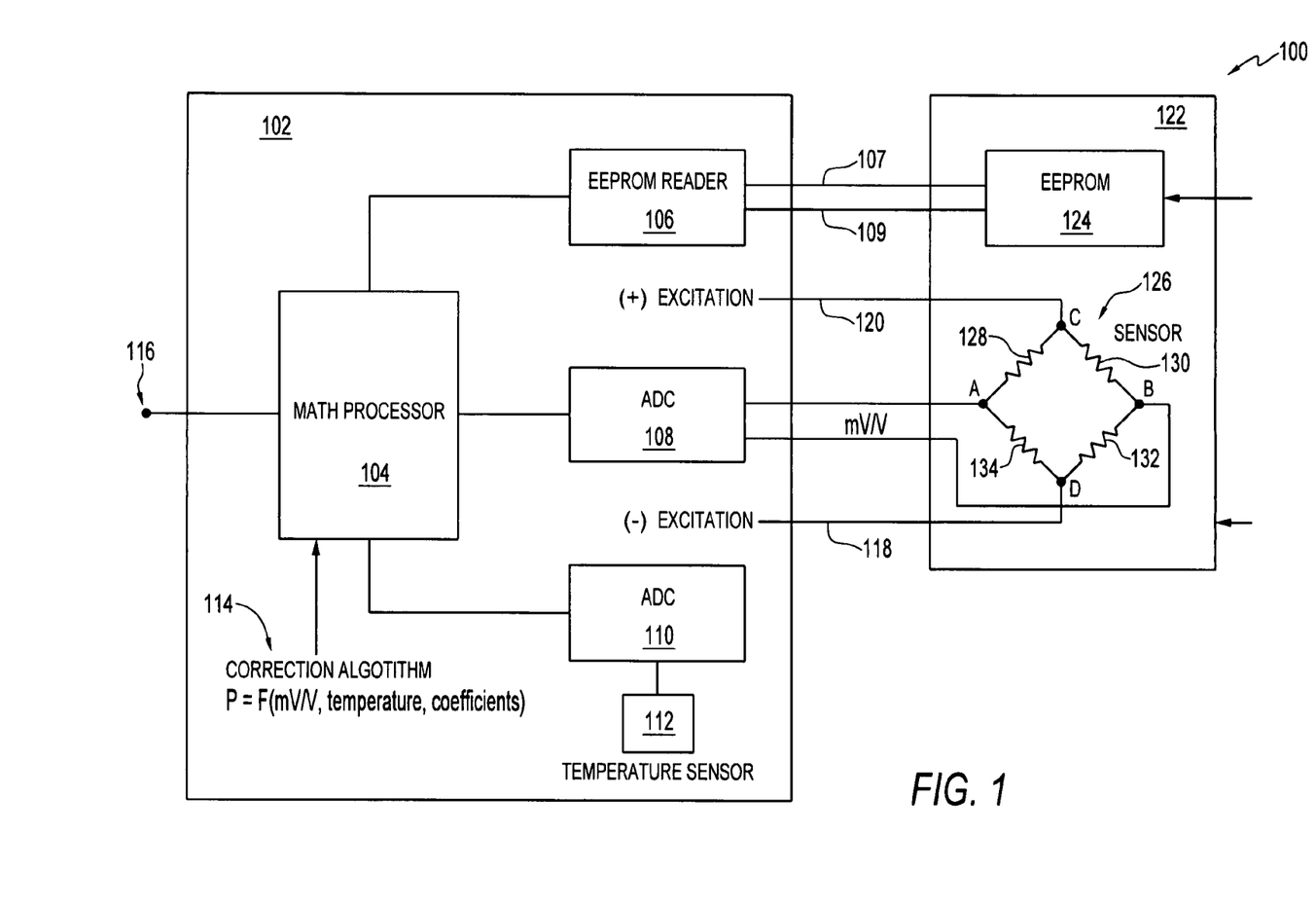
FIG. 1 illustrates a pressure sensing system that can be implemented in accordance with a preferred embodiment.

FIG. 1 illustrates a pressure sensing system 100 that can be implemented in accordance with a preferred embodiment. In general, system 100 includes a housing or sensing component 122 that includes a sensor 126 composed of a plurality of resistors 128, 130, 132, 134 arranged in a Wheatstone bridge circuit configuration. Such resistors 128, 130, 132, 134 can be provided as, for example, magnetoresistive sensing elements. Resistor 128 is generally connected to resistor 134 at a node A, while resistor 130 is generally connected to a resistor 132 at a node B. Similarly, a resistor 128 is connected to resistor 130 at a node C, while resistor 132 is generally connected to a resistor 134 at a node D. Sensing component 122 is preferably implemented in the context of a pressure transducer housing.

Sensor 126 can be provided in the context of sensing component 122 in association with a memory circuit 124, which can be, for example, an EEPROM (Electrically Erasable Programmable Read-Only Memory) component. Note that as utilized herein, "EEPROM" refers generally to a type of memory integrated circuit chip that retains data content after power has been removed. An EEPROM chip or circuit can be erased and reprogrammed within a computer or externally. In general, memory circuit 124, when implemented as an EEPROM constitutes a type of chip in which higher voltage may be applied to one of the pins to erase its previous memory before a new instruction set is electronically written.

System 100 also includes a sensing component 102 that includes a reader circuit 106 connected to a math processor 104, which in turn is connected to a first analog-to-digital converter (ADC) 108 and a second ADC 110. The sensing component 102 can be, for example, a host system. The reader circuit 106 is preferably provided as an EEPROM reader and is generally connected to the memory circuit 124 via electrical connection lines 107, 109.

A temperature sensor 112 is also provided as a part of the sensing component 102. The temperatures sensor 112 is connected to the second ADC 110. One or more excitation signals 118, 120 are generally connected to the sensor 126. Excitation signal 118 can be provided as a negative excitation signal, while excitation signals 120 can be provided as a positive excitation signal. Excitation signal 118 can be provided to sensor 126 at node C, while excitation signal 118 is generally provided to sensor 126 at node D. The memory circuit 124 can store unique sensor coefficients supplied to the math processor 104 to enable corrections to one or more sensor signals associated with system 100.

A correction algorithm 114 can be provided to math processor 104 in order to provide a high order polynomial component to system 100. The configuration depicted in FIG. 1 can be implemented in the context of a highly accurate and low-cost pressure sensor that can be utilized, for example, to monitor natural gas line pressure over a wide temperature and pressure range. System 100 can be implemented utilizing Advanced Thick Film (ATF) technology an EEPROM memory integrated circuit such as memory circuit 124. Note that as utilized herein, "ATF" refers generally to a process for bonding ceramic to metal that facilitates modular construction and easy customization of resulting devices, such as, for example, pressure and/or temperatures sensors. One non-limiting example of ATF technology is disclosed in U.S. Patent Application Publication No. US2005/0150303A1, "Ceramic on Metal Pressure Transducer" to William Maitland Jr., et al., which published on Jul. 14, 2005 and is assigned to Honeywell International Inc.

The EEPROM or memory circuit 124 can store coefficients of a high order polynomial such as that provided by correction algorithm 114, which can describe pressure and/or temperature calibration surface data. The form and order of the polynomial can be specifically matched to the pressure and temperature performance of the ATF sensing system 100.

Figure 2:
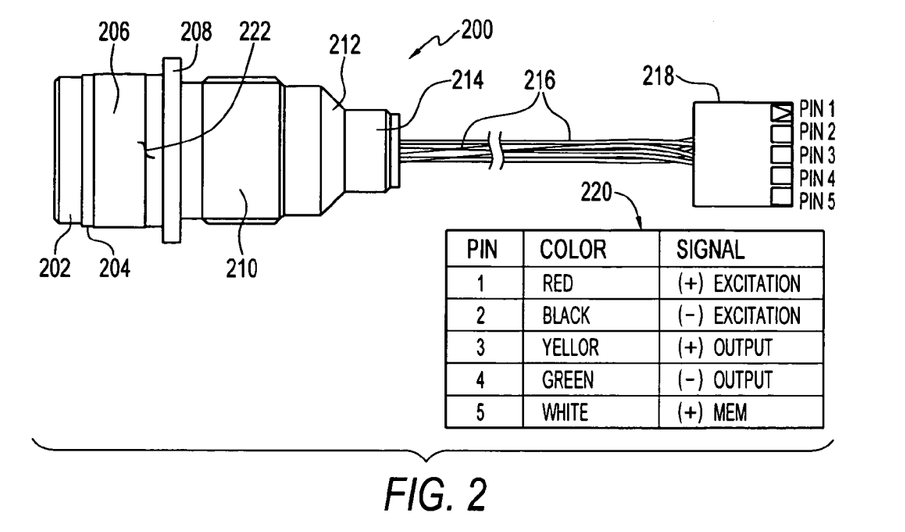
FIG. 2 illustrates a side view of a pressure sensing system that can be implemented in accordance with an embodiment.

FIG. 2 illustrates a side view of a pressure sensing system 200 that can be implemented in accordance with an embodiment. System 200 can be implemented in order to comply with the configuration of system 100 depicted in FIG. 1. System 200 generally functions according to the components of system 100 illustrated in FIG. 1 and includes a pressure containment weld 204 and pressure sensor port and housing portions 202, 206. An ATF pressure sensor diaphragm 222 can be enclosed within the pressure sensor port and housing and is attached to the pressure port. A thin portion 208 can be located adjacent housing portion 206. A threaded portion 210 can also be provided in addition to pressure sensor housing portions 212 and 214.

A plurality of wires 216 protrude from housing portion 214 and are generally attached to a connector portion 218 that provides a plurality of pins 1, 2, 3, 4, 5. In one possible embodiment, pin 1 may be labeled "red" and can be provided with a positive excitation signal, while pin 2 can be labeled "black" and provided with a negative excitation signal. Pin 3, which may be labeled "yellow," can provide a positive output, while pin 4, which is labeled "green" can provide a negative output. Pin 5, which may be labeled "white" can provide memory data input to a memory circuit, such as, for example, memory circuit or EEPROM 124 depicted in FIG. 1. Chart 220 depicted in FIG. 1 generally summarizes a possible pin/color/signal configuration associated with pressure sensing system 200.

Figure 3:
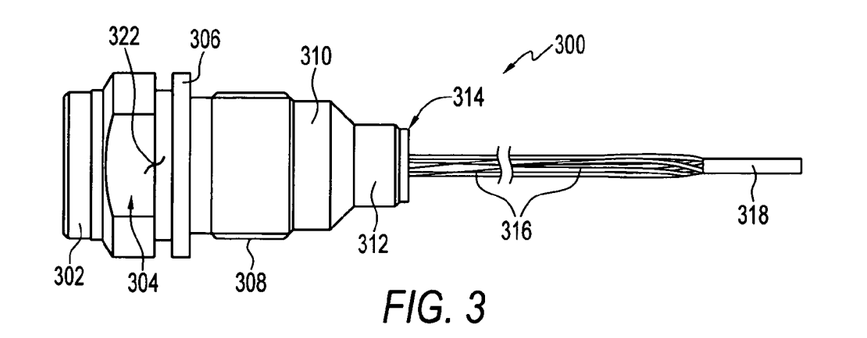
FIG. 3 illustrates a side view of a pressure sensing system that can be implemented in accordance with an alternative embodiment.

FIG. 3 illustrates a side view of a pressure sensing system 300 that can be implemented in accordance with an alternative embodiment. System 300 operates in a manner similar to that of system 200 depicted in FIG. 2 with some minor adjustments to its shape. In general, system 300 includes a port portion 302 adjacent a housing portion 304 that includes an indented shape. An ATF pressure sensor diaphragm 322 can be enclosed within the pressure sensor port and housing and is also attached to the pressure port. A threaded portion 308 is also provided, which is identical to the threaded portion depicted in FIG. 2. The threaded portion 308 is located proximate to the narrow housing portion 306 and pressure sensor housing portions 310, 312 and 314. A plurality of wires 316 also protrude from housing portion 314 in the same manner as that depicted in the configuration depicted in FIG. 2. A conducting end cap 318 is also provide, which can engage the connector 218 depicted in FIG. 2.

Figure 4:
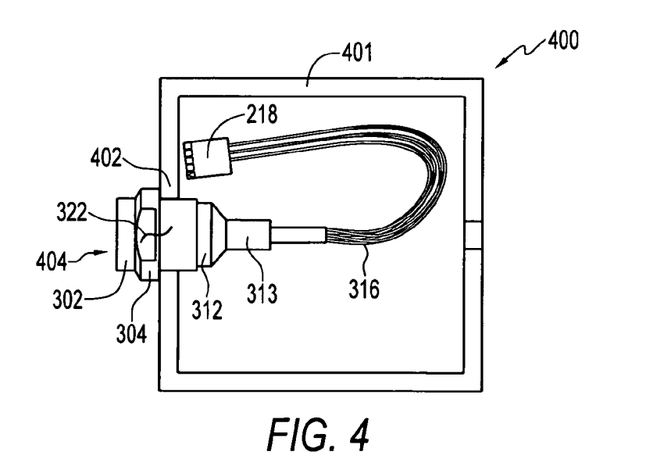
FIG. 4 illustrates a side view of a pressure sensing system that can be implemented in accordance with another embodiment.

FIG. 4 illustrates a side view of a pressure sensing system 400 that can be implemented in accordance with another embodiment. Note that in FIGS. 2, 3, and 4, identical components are generally indicated by identical reference numerals. As indicated in FIG. 4, a sensor component 404 generally includes sensor pressure housing portions 302, 322, 304, 312, 313 and wires 316, which protrude from housing portion 313. Wires 316 engage with the connector portion 218 via the conducting end cap 318 illustrated in FIG. 3. In general, a pressure containment component 401 maintains pressure sensor housing portions 312, 313 and wires 316, along with connector 218 with pressurized media.

Figure 5:
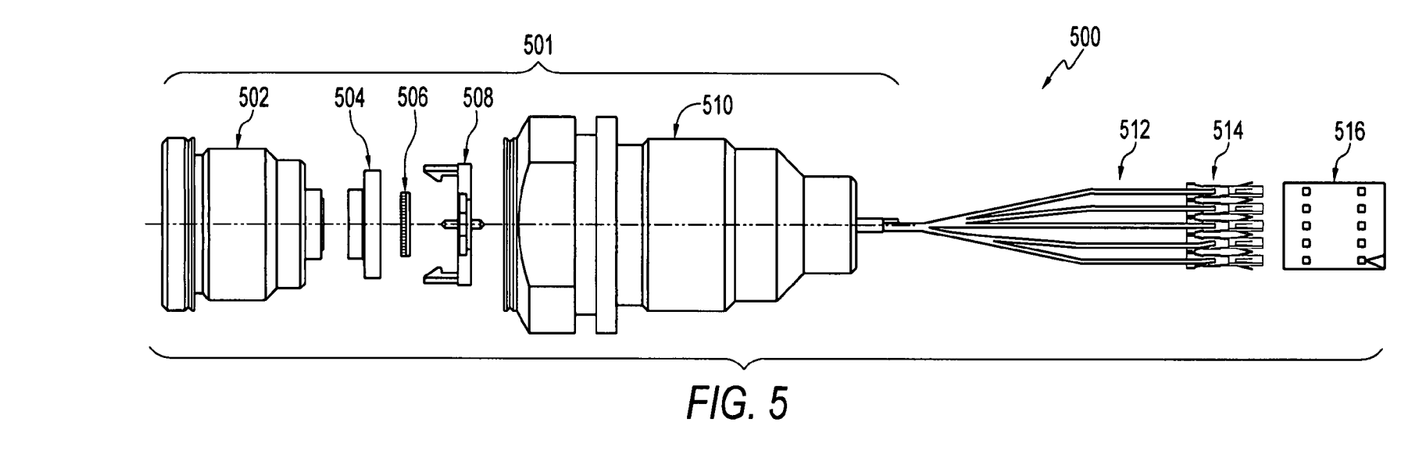
FIG. 5 illustrates an exploded view of a pressure sensing system that can be implemented in accordance with an alternative embodiment.
Figure 6:
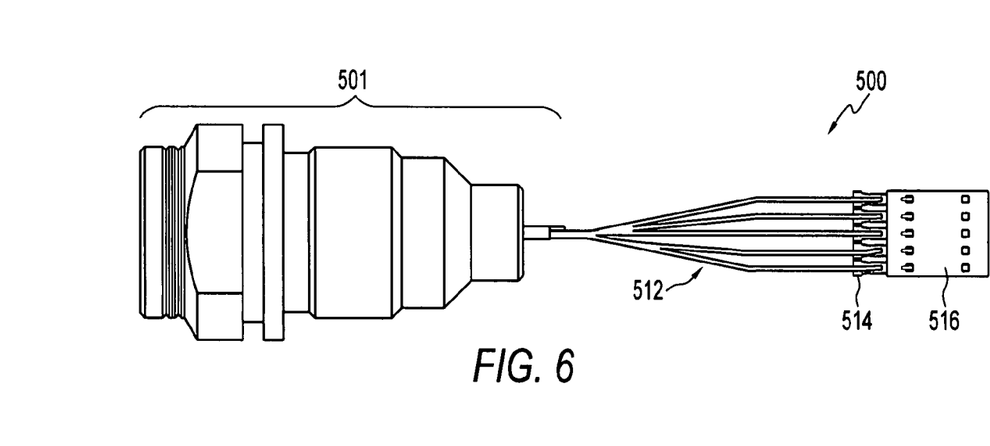
FIG. 6 illustrates a compact view of the pressure sensing system depicted in FIG. 5 in accordance with an alternative embodiment.

FIG. 5 illustrates an exploded view of a pressure sensing system 500 that can be implemented in accordance with an alternative embodiment. System 500 generally includes a pressure sensing port portion 502 that engages the ATF pressure sensor diaphragm component 504 and associated electrical components 506 and 508. The pressure sensing port portion 502 also contacts a housing portion 510 which protects components 504, 506 and 508, and from which wires or leads 512 can protrude and engage with respective pins 514 that in turn are maintained by a connector 516 that is analogous to the connector 218 described earlier with respect to FIGS. 2 to 4. FIG. 6 illustrates a compact view of the pressure sensing system 500 depicted in FIG. 5 in accordance with an alternative embodiment. Note that in FIGS. 5-6, identical or similar components or elements are generally indicated by identical reference numerals.

Figure 7:
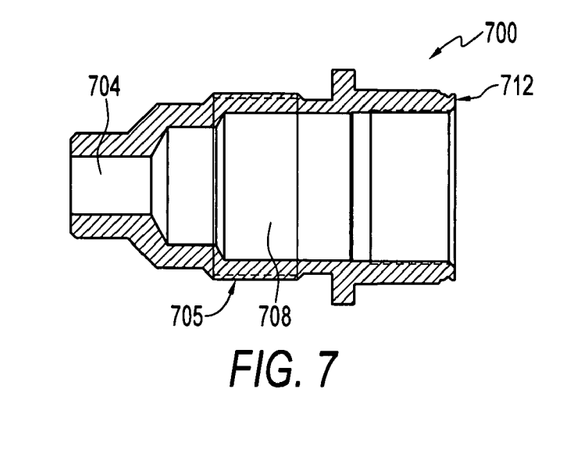
FIG. 7 illustrates a side sectional view of a pressure sensing system that can be implemented in accordance with another embodiment.

FIG. 7 illustrates a side sectional view of a pressure sensing housing 700 that can be implemented in accordance with another embodiment. In general, system 700 can function according to the configuration depicted in FIG. 1, as a protective housing of components 502, 504, 506 and 508 in FIG. 5. System 700 generally includes a cable exit orifice 701 where the wiring exits. Cavity section 708 is where components 502, 504, 506 and 508 of FIG. 5 reside. System 700 also includes a weld lip 707 and 712 for attachment to the pressure senor port, 502 in FIG. 5, an external thread, 705 for attachment to the pressure containment component 401 in FIG. 4 and two flats for mounting purposes 716.

Figure 8:
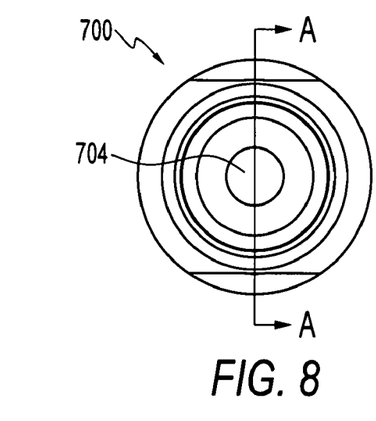
FIG. 8 illustrates a top view of the pressure sensing system depicted in FIG. 7 in accordance with another embodiment.
Figure 9:
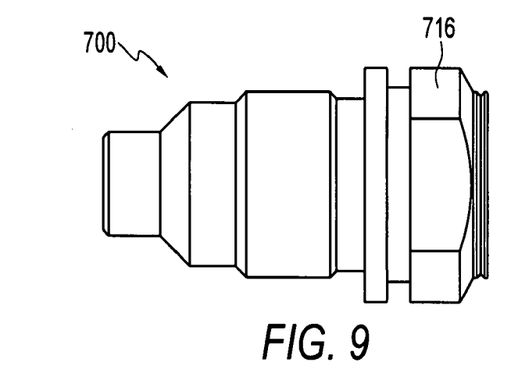
FIG. 9 illustrates an external side view of the pressure sensing system depicted in FIGS. 7-8 in accordance with another embodiment.
Figure 10:
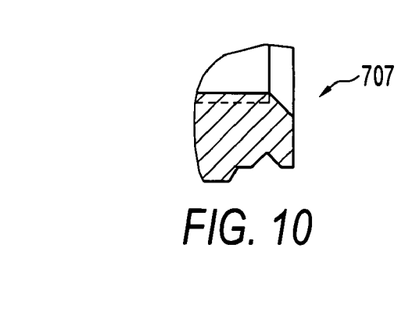
FIG. 10 illustrates a portion of the pressure sensing system depicted in FIGS. 7-9 in accordance with another embodiment.

FIG. 8 illustrates a top view of the pressure sensing system 700 depicted in FIG. 7 in accordance with another embodiment. Note that in FIG. 8, a top flat top portion 718 is shown. FIG. 9 illustrates an external side view of the pressure sensing system 700 depicted in FIGS. 7-8 in accordance with another embodiment. FIG. 10 illustrates a portion 701 of the pressure sensing system 700 depicted in FIGS. 7-9 in accordance with another embodiment.

Figure 11A:
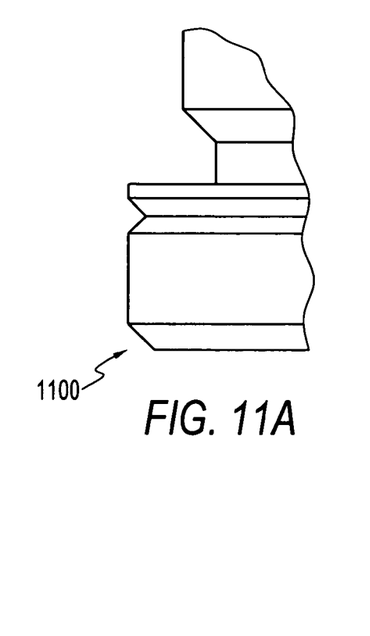
FIG. 11(a) illustrates a sectional view of a pressures sensing system, which can be implemented in accordance with an alternative embodiment.
Figure 11B:
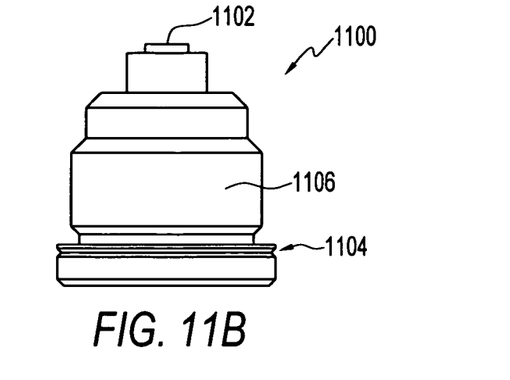
FIG. 11(b) illustrates a side view of the pressure sensing system depicted in FIG. 11(a)
Figure 11C:
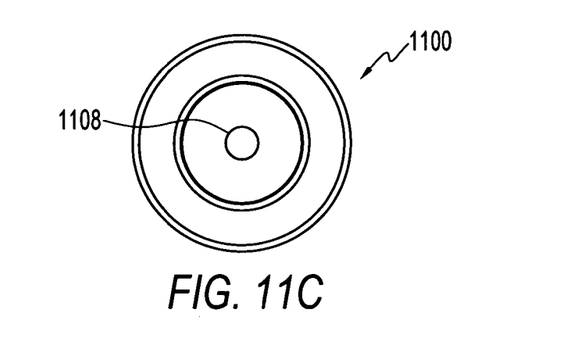
FIG. 11(c) illustrates a top view of the pressure sensing system depicted in FIGS. 11(a) to 11(b)

FIG. 11(a) illustrates a sectional view of a pressures sensing system 100, which can be implemented in accordance with an alternative embodiment. FIG. 11(b) illustrates a side view of the pressure sensing system 1100 depicted in FIG. 11(a). Similarly, FIG. 11(c) illustrates a top view of the pressure sensing system 1100 depicted in FIGS. 11(a) to 11(b).

Figure 12A:
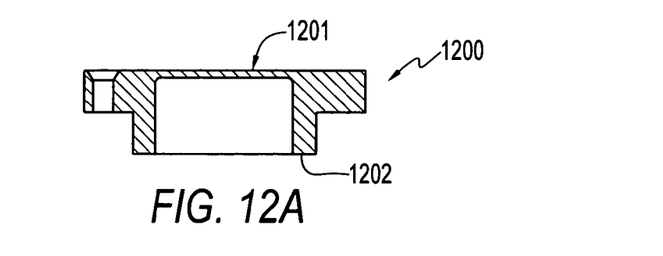
FIGS. 12(a) and 12(b) respectively illustrate sectional and top views of a pressure sensor component, in accordance with an alternative embodiment.

System 1100 generally constitutes a pressure sensor port and includes two or more weld surfaces, including a welded surface 1102 for attaching a pressure sensor diaphragm to the configuration depicted in FIG. 12. System or pressure port 1100 also includes a weld surface 1104 for attaching to the pressure sensing housing and components 700, 707, and 712 depicted in FIG. 7. An external mounting thread 1106 can also be implemented, which provides additional strength between the pressure sensor system or port 1100 and the pressure sensing housing 700 depicted in FIG. 7. The internal thread 1108 can be utilized to attach the pressure sensing with the electronic data sheet configuration described herein to a pressure source.

Figure 12B:
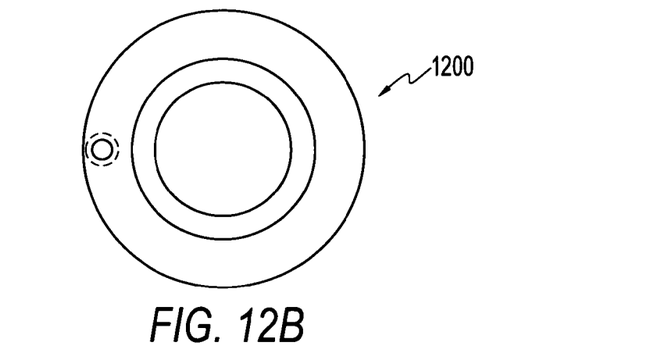

FIGS. 12(a) and 12(b) respectively illustrate sectional and top views of a pressure sensor component 1200, in accordance with an alternative embodiment. In general, a weld surface 1202 can be attached to pressure sensor port 1100 depicted in FIG. 11. The pressures sensor component 1200 includes a pressure sensor diaphragm 1201 that acts as a force collector, converting applied pressure to a proportional voltage output signal. Note that the pressure sensor component 1200 can be implemented in the context of an ATF pressure sensor diaphragm, depending of course upon design considerations.

Based on the foregoing it can be appreciated that a pressure sensor 126 can be configured, which generally includes a pressure sensing diaphragm, a pressure port and a pressure housing. A memory circuit 124 can be incorporated into the pressure housing 122. A high order polynomial component 114 can also be provided. One or more excitation signals 118, 120 are then applicable to the pressure sensor 126 or pressure sensing system 100 such that a voltage output thereof is measured and recorded at a plurality of predefined temperatures and pressures in order to generate pressure sensor output data. Such output data is then automatically input to the high order polynomial component 114 in order to generate a set of correction coefficients usable for improving the accuracy of the pressure sensor 126.

The pressure sensing diaphragm is preferably based on an Advanced Thick Film (ATF) configuration. The set of correction coefficients is stored in the memory circuit 123, which may be provided as an EEPROM memory component. The set of correction coefficients is thus stored in the EEPROM memory component 124.

Additionally, the excitation signals can be provided in the context of a positive signal 118 or a negative signal 120. A reader circuit 106 can also be provided for accessing and retrieving data from the memory circuit 124. Such a reader circuit 106 can be provide as, for example, an EEPROM reader.

A math processor 116 can be provided for implementing the high order polynomial component, while a first analog-to-digital converter 108 can be utilized, which receives data generated by the math processor 104. Such a first analog-to-digital converter 108 is generally connected to the pressure sensor 126. A second analog-to-digital converter 110 can also be provided, which receives data generated by the math processor 104. Finally, a temperature sensor 112 can be provided, which is connected to the second analog-to-digital converter 110.

In general, a high accuracy low-cost pressure sensor system 100 can be constructed by combining a diaphragm made utilizing ATF technology in association with a pressure port with an EEPROM memory IC chip. The excitation signal 118 and/or 120 is applied to the pressure sensor 126 and its voltage output is measured and recorded at various predefined temperatures and pressures. The pressure sensor output data is then entered into a high order polynomial. The polynomial generates a set of correction coefficients that can be used to improve the accuracy of the pressure sensor. These coefficients can be permanently stored in the memory of the EEPROM and can be accessed at any time.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A pressure sensing system, comprising:
   a pressure sensor comprising a pressure sensing diaphragm and a pressure port associated with said pressure sensing diaphragm;
   a memory circuit incorporated into said pressure port; and
   a high order polynomial component, wherein at least one excitation signal is applicable to said pressure sensor such that a voltage output thereof is measured and recorded at a plurality of predefined temperatures and pressures in order to generate pressure sensor output data that is automatically input to said high order polynomial component in order to generate a set of correction coefficients usable for improving an accuracy of said pressure sensor.

2. The system of claim 1 wherein said pressure sensing diaphragm comprises an Advanced Thick Film (ATF) configuration.

3. The system of claim 1 wherein said set of correction coefficients is stored in said memory circuit.

4. The system of claim 1 wherein said memory circuit comprises an EEPROM memory component.

5. The system of claim 4 wherein said set of correction coefficients is stored in said EEPROM memory component.

6. The system of claim 1 wherein said at least one excitation signal comprises a positive signal or a negative signal.

7. The system of claim 1 further comprising a reader circuit for accessing and retrieving data from said memory circuit.

8. The system of claim 7 wherein said reader circuit comprises an EEPROM reader.

9. The system of claim 8 further comprising:
   a math processor for implementing said high order polynomial component;
   a first analog-to-digital converter that receives data generated by said math processor, wherein said first analog-to-digital converter is connected to said pressure sensor;
   a second analog-to-digital converter that receives data generated by said math processor; and
   a temperature sensor connected to said second analog-to-digital converter.

10. A pressure sensing system, comprising:
    an Advanced Thick Film (ATF) pressure sensor comprising a pressure sensing diaphragm and a pressure port associated with said pressure sensing diaphragm;
    an EEPROM memory component incorporated into said pressure port; and
    a high order polynomial component, wherein said set of correction coefficients is stored in said EEPROM memory component and wherein at least one excitation signal is applicable to said pressure sensor such that a voltage output thereof is measured and recorded at a plurality of predefined temperatures and pressures in order to generate pressure sensor output data that is automatically input to said high order polynomial component in order to generate a set of correction coefficients usable for improving an accuracy of said ATF pressure sensor.

11. The system of claim 10 further comprising:
    a math processor for implementing said high order polynomial component;
    a first analog-to-digital converter that receives data generated by said math processor, wherein said first analog-to-digital converter is connected to said pressure sensor;
    a second analog-to-digital converter that receives data generated by said math processor;
    a temperature sensor connected to said second analog-to-digital converter; and
    an EEPROM reader connected to said EEPROM memory component and said math processor.

12. A pressure sensing method, comprising:
    configuring a pressure sensor to comprise a pressure sensing diaphragm and a pressure port associated with said pressure sensing diaphragm;

incorporating a memory circuit into said pressure port; and providing a high order polynomial component, wherein at least one excitation signal is applicable to said pressure sensor such that a voltage output thereof is measured and recorded at a plurality of predefined temperatures and pressures in order to generate pressure sensor output data that is automatically input to said high order polynomial component in order to generate a set of correction coefficients usable for improving an accuracy of said pressure sensor.

13. The method of claim 12 further comprising configuring said pressure sensing diaphragm utilizing Advanced Thick Film (ATF) technology.

14. The method of claim 12 further comprising automatically storing said set of correction coefficients in said memory circuit.

15. The method of claim 12 wherein said memory circuit comprises an EEPROM memory component.

16. The method of claim 12 further comprising storing set of correction coefficients in said EEPROM memory component.

17. The method of claim 12 wherein said at least one excitation signal comprises a positive signal or a negative signal.

18. The method of claim 12 further comprising providing a reader circuit for accessing and retrieving data from said memory circuit.

19. The method of claim 18 wherein said reader circuit comprises an EEPROM reader.

20. The method of claim 18 further comprising:

providing a math processor for implementing said high order polynomial component;

connecting a first analog-to-digital converter to said pressure sensor, wherein said first analog-to-digital converter receives data generated by said math processor;

providing a second analog-to-digital converter that receives data generated by said math processor; and connecting a temperature sensor connected to said second analog-to-digital converter.

* * * * *